United States Patent Office 3,309,955
Patented Mar. 21, 1967

3,309,955
FASTENER WITH ROTATABLY ENGAGED HEAD
Albert E. Turnbull and George McDonald, Slough, England, assignors to Illinois Tool Works Inc., Chicago, Ill., a corporation of Delaware
Filed Oct. 13, 1964, Ser. No. 403,557
Claims priority, application Great Britain, Oct. 14, 1963, 40,449/63
4 Claims. (Cl. 85—5)

This invention is concerned with fasteners comprising a shank to engage in a hole in a support panel, and a head to engage in a hole in a second panel to secure the second panel to the support panel. For example, in a motor vehicle the shank may engage in a hole in a part of the pressed steel structure of the vehicle, and the head may secure in position a trim panel for decorative purposes.

According to the present invention, the head of the fastener is in the form of a flange of which the edge is recessed radially inwards on one side so that the head can be inserted through the hole in the second panel by inclining the head, inserting through the hole in the second panel one of the two corners at the recess, and twisting the head through the hole with a screwing action of one revolution.

The recess in the flange is preferably approximately V-shaped, the angle of the V being preferably less than 140°. However, as an alternative in some circumstances the recess may be flat, that is to say as though formed by making a straight cut through the flange.

The fastener is preferably moulded in one piece and is of a resilient plastic, for example nylon. There are preferably shoulders on the shank to secure the shank in the support panel, the shank being snapped into the support panel after the head has been screwed into the hole in the second panel.

Figure 1:
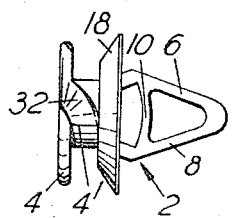
Figure 2:
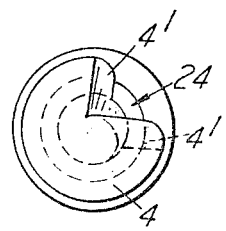
Figure 3:
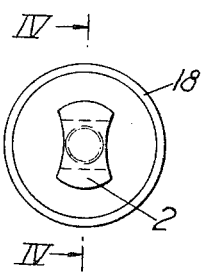
Figure 4:
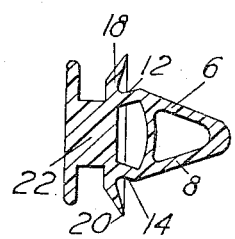
Figure 5:
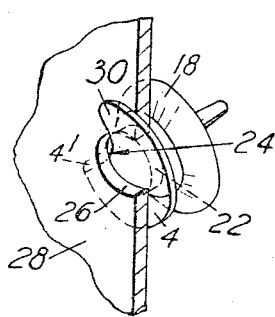
Figure 6:
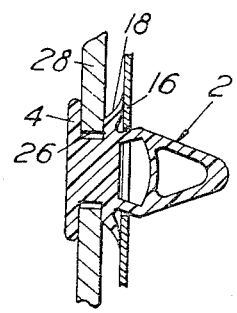
Figure 8:
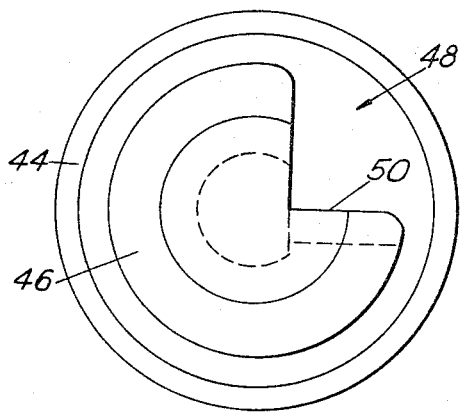
Figure 7:
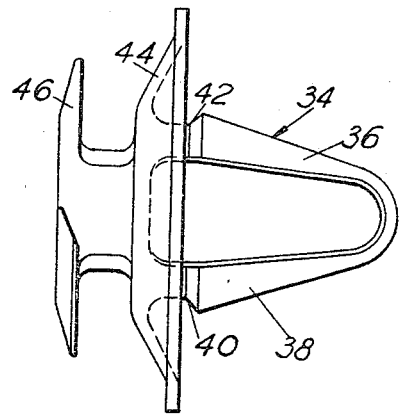

Two examples of fasteners according to this invention are shown in the accompanying drawings. In these drawings:

FIGURE 1 is a side view of one fastener;
FIGURE 2 is an end view from the left of FIGURE 1;
FIGURE 3 is an end view from the right of FIGURE 1;
FIGURE 4 is a longitudinal section on the line IV—IV in FIGURE 3;
FIGURE 5 is a fragmentary perspective view showing the head of the fastener being inserted through a hole in a support panel;
FIGURE 6 is a sectional view similar to FIGURE 4, but showing the fastener in use;
FIGURE 7 is a side view of a different fastener; and
FIGURE 8 is an end view from the left of FIGURE 7.

The fastener shown in FIGURE 1 comprises a shank 2 with a head 4 at one end. The shank is formed by laterally spaced side portions 6 and 8 which converge towards the tip of the shank and are connected by a bridging portion 10. Parts of the side portions nearest the head 4 converge towards one another so as to define oblique shoulders 12 and 14 (see FIGURE 4) to engage the edge of a hole in a support panel 16 in the manner shown in FIGURE 6. The shoulders engage the edge at the right-hand side of the panel 16, and the left-hand face of the panel 16 is engaged by a sealing flange 18 around the shank of the fastener. The flange 18 is dished so as to be inclined towards the support panel as seen in cross-section. When the shank is snapped into the support panel, the flange is flexed towards the head of the fastener, so that its edge 20 presses firmly against the support panel so as to form a tight seal.

The head 4 is joined to the hollow shank part by a solid portion 22. As shown particularly in FIGURE 2, the head is in the form of a flange with a V-shaped recess 24. As shown in FIGURE 5, the head is inserted through a hole 26 in a panel 28 by first inserting through the hole a corner 30 at the recess, after which the fastener is turned in a counter-clockwise direction (as viewed in FIGURE 5) to screw the head through the hole 26.

The edges of the recess 24 in the head are both bevelled at 4' to facilitate the screwing-in action. In fact, the bevelled edges are approximately shaped so as to define partialy a roughly helical groove 32 which also extends into the solid part 22 of the fastener.

FIGURE 6 shows the fastener in use securing a panel 28 to a support panel 16. It will be appreciated that the method of assembly consists of first twisting the head of the fastener into the panel 28, after which the shank 2 of the fastener is snapped into the hole in the support panel 16.

The shank of the fastener shown in FIGURES 1 to 6 embodies an invention which is the subject of British Patent No. 903,146.

The fastener shown in FIGURES 7 and 8 is similar to the fastener already described in that it has a shank 34 consisting of laterally spaced side portions 36 and 38 formed with oblique shoulders 40 and 42. Around the shank there is a dished sealing flange 44, and the fastener includes finally a head 46 spaced from the sealing flange 44. The head in this case has a 90° V-shaped recess 48 of which one edge 50 is bevelled, the edge 50 being the leading edge during the screwing action. As an alternative to being bevelled, the edge 50 may be rounded.

The shank of either of the fasteners shown in the accompanying drawings may be in various different forms. For example, as an alternative to the forms shown in the drawings, the shank may consist of two or more laterally spaced prongs, each having a shoulder, the free ends of the prongs being spaced from one another. For example, there may be four prongs.

We claim:
1. An integral, one piece, plastic fastener adapted to connect a complementary panel member to a support member in spaced relation thereto, said complementary panel member having an uninterrupted circular aperture of predetermined diameter and said support member having an aperture to be placed in alignment with said circular aperture, said fastener including a shank with a substantially circular head at one end thereof, said shank having a resilient first portion at the end opposite the head adapted to be accepted within the support member aperture and a solid second portion integral with the central portion of said head, said second portion adapted to fill a substantial portion of said panel aperture, a continuous resilient dished flange extending outwardly from said shank substantially at the juncture of said first and second portions and thence downwardly toward said first portion, said head being substantially planar and circular in configuration and extending laterally from said second portion, the diametral extent of said head being substantially greater than the diameter of the aperture in said panel member, a substantially right-angular V-shaped cut-out extending axially through said head, said cut-out removing a substantial portion of one quadrant of said head, at least one edge of said head adjacent said cut-out being reduced in thickness, said second portion of said shank having material removed therefrom by an axial continuation of said cut-out to provide a reduced cross section capable of being canted within the aperture in said panel member, the diametral measurement of said head from the apex of said cut-out to the opposite peripheral edge being equal to or less than the diameter of said panel aperture whereby said fastener head can be twisted through said panel aperture with a screwing action of one turn, said dished flange having a diameter greater than both of said apertures so as to resiliently seal off the aperture in said support panel and act as a spacer between said panel.

2. A fastener according to claim 1 wherein said V-shaped cut-out is helically disposed to provide a beveled edge along said one edge of said head which is reduced in thickness and the material removed from said second portion of said shank being in the form of a helically disposed groove with the same angle of inclination as the bevel on the edge of the V in said head.

3. A device of the type claimed in claim 1 wherein said V-shaped cut-out along at least one of its edges and the second portion of said shank having material removed therefrom are defined by a substantially axially extending planar surface.

4. A fastener according to claim 1 in which at least one of the two edges of the recess is bevelled to facilitate the screwing in action during use.

References Cited by the Examiner

UNITED STATES PATENTS

| | | | |
|---|---|---|---|
| 988,743 | 4/1911 | Stillwagon | 85—5.2 |
| 1,999,994 | 4/1935 | Jones | 85—5.2 |
| 2,799,899 | 7/1957 | Chadwick | 24—73 |
| 2,909,957 | 10/1959 | Rapata | 85—5 |
| 2,983,008 | 5/1961 | Von Rath. | |
| 3,029,486 | 4/1962 | Raymond. | |
| 3,225,641 | 12/1965 | Harris et al. | 85—5 |

FOREIGN PATENTS 17,742   12/1916   Great Britain.

EDWARD C. ALLEN, Primary Examiner.

CARL W. TOMLIN, Examiner.

M. PARSONS, JR., Assistant Examiner.